(12) United States Patent
Achten (10) Patent No.: US 9,321,339 B2
(45) Date of Patent: Apr. 26, 2016

(54) VEHICLE WITH A HYDRAULIC DRIVE SYSTEM

(71) Applicant: Peter A. J. Achten, CA Eindhoven (NL)

(72) Inventor: Peter A. J. Achten, CA Eindhoven (NL)

(73) Assignee: INNAS B.V. (NL)

( * ) Notice: Subject to any disclaimer, the term of this patent is extended or adjusted under 35 U.S.C. 154(b) by 40 days.

(21) Appl. No.: 14/185,434

(22) Filed: Feb. 20, 2014

(65) Prior Publication Data

US 2014/0166387 A1 Jun. 19, 2014

Related U.S. Application Data

(60) Division of application No. 13/277,982, filed on Oct. 20, 2011, now Pat. No. 8,678,654, which is a continuation of application No. PCT/EP2010/054702, filed on Apr. 9, 2010.

(30) Foreign Application Priority Data

Apr. 20, 2009 (EP) ..................................... 09158296
Jun. 2, 2009 (EP) ..................................... 09161738

(51) Int. Cl.
*B60K 6/12* (2006.01)
*F04B 1/20* (2006.01)
(Continued)

(52) U.S. Cl.
CPC ................. *B60K 6/12* (2013.01); *B60K 7/0015* (2013.01); *B60K 17/356* (2013.01); *F04B 1/2021* (2013.01); *F04B 1/2071* (2013.01); *F04B 1/2085* (2013.01); *F04B 1/24* (2013.01); *F15B 11/0445* (2013.01); *F16C 32/0629* (2013.01); *F16C 32/0659* (2013.01); *F16C 32/0692* (2013.01); *F16H 61/4096* (2013.01); *F15B 3/00* (2013.01); *F15B 21/14* (2013.01); *F16H 61/448* (2013.01); *Y02T 10/6208* (2013.01)

(58) Field of Classification Search
CPC ........................................................ B60K 6/52
See application file for complete search history.

(56) References Cited

U.S. PATENT DOCUMENTS 3,583,777 A 6/1971 Yang et al.
3,635,533 A 1/1972 Galloway
(Continued)

FOREIGN PATENT DOCUMENTS

CH 503901 A 2/1971
DE 2815476 A1 2/1980
(Continued)

OTHER PUBLICATIONS

Notification of Reasons for Refusal from the Japanese Patent Office Application No. JP 2014-060268 Issued: Feb. 3, 2015 3 pages.
(Continued)

*Primary Examiner* — Tony Winner
(74) *Attorney, Agent, or Firm* — St. Onge Steward Johnston and Reens, LLC (57) ABSTRACT

A vehicle with a hydraulic transformer including a forward propulsion valve and a reverse propulsion valve connecting a common low-pressure rail respectively to a first motor line and a second motor line, which propulsion valves have a spring to hold the valve in a first position wherein it acts as a check valve blocking the flow to the common low-pressure rail and an actuator that can switch the propulsion valve to a second position connecting the common low-pressure rail to one of the motor lines.

13 Claims, 11 Drawing Sheets

(51) Int. Cl.

| | | |
|---|---|---|
| *F04B 1/24* | (2006.01) | |
| *F16C 32/06* | (2006.01) | |
| *F16H 61/4096* | (2010.01) | |
| *B60K 7/00* | (2006.01) | |
| *B60K 17/356* | (2006.01) | |
| *F15B 11/044* | (2006.01) | |
| *F15B 3/00* | (2006.01) | |
| *F15B 21/14* | (2006.01) | |
| *F16H 61/448* | (2010.01) | |

(56) References Cited

U.S. PATENT DOCUMENTS

| | | | | |
|---|---|---|---|---|
| 3,721,161 | A | | 3/1973 | Bobst |
| 4,224,859 | A | | 9/1980 | Eisenmann et al. |
| 4,227,753 | A | | 10/1980 | Wilcock |
| 4,570,741 | A | * | 2/1986 | McCoy .................. 180/242 |
| 4,920,856 | A | | 5/1990 | Berthold et al. |
| 5,983,781 | A | | 11/1999 | Ivantysyn |
| 6,119,802 | A | | 9/2000 | Puett, Jr. |
| 7,100,723 | B2 | * | 9/2006 | Roethler et al. .............. 180/165 |
| 8,276,503 | B2 | | 10/2012 | Cichon |
| 2006/0055238 | A1 | | 3/2006 | Walker |
| 2007/0289441 | A1 | | 12/2007 | Guggemos et al. |

FOREIGN PATENT DOCUMENTS

| | | | |
|---|---|---|---|
| EP | 1705372 | A1 | 9/2006 |
| JP | S5322203 | U | 2/1978 |
| JP | H06166341 | A | 6/1994 |
| JP | H11504292 | A | 4/1999 |
| JP | 2002206637 | A | 7/2002 |
| JP | 2004340190 | A | 12/2004 |

OTHER PUBLICATIONS

International Search Report; Application No. PCT/EP2010/054702; Issued: Sep. 20, 2010; Mailing Date: Oct. 12, 2010; 6 pages.

Japanese Office Action Summary Application No. 2012-506437 Issued: Dec. 26, 2013 2 pages.

* cited by examiner

VEHICLE WITH A HYDRAULIC DRIVE SYSTEM

FIELD OF THE INVENTION

The invention concerns a vehicle with a hydraulic drive system comprising a common high-pressure rail with a high-pressure accumulator, a common low-pressure rail with a low-pressure accumulator, an internal combustion engine driving a pump connected to the common high-pressure rail and the common low-pressure rail, for each front wheel and/or for each rear wheel a motor/pump unit and a hydraulic transformer with 4-quadrant operation with connections to the common high-pressure rail and via a first motor line and a second motor line to the motor/pump unit.

BACKGROUND OF THE INVENTION

In the known systems, the motor/pump unit and the hydraulic transformer are coupled directly. This leads to the situation when the setting of the hydraulic transformer has as result that the motor/pump unit exerts a braking torque on the wheel that after the wheel has stopped rotating the braking torque starts acting as a driving torque in reverse direction if the setting of the hydraulic transformer is not changed immediately. For instance during parking of the vehicle, this could lead to undesirable situations.

SUMMARY OF THE INVENTION

In order to overcome this disadvantage the hydraulic transformer comprises a forward propulsion valve connecting the common low-pressure rail respectively to a first motor line and a reverse propulsion valve connecting the common low-pressure rail to a second motor line, which propulsion valves have a spring to hold the valve in a first position wherein it acts as a check valve blocking the flow to the common low-pressure rail and an actuator that can switch the propulsion valve to a second position connecting the common low-pressure rail to the respective motor line. In this way, a wheel can only rotate in one direction unless the control system changes the setting of a valve. This prevents undesired or unexpected rotations of the wheels.

BRIEF DESCRIPTION OF THE DRAWINGS

The invention will be explained in more detail below with reference to several exemplary embodiments by means of a drawing, in which.

DETAILED DESCRIPTION OF THE INVENTION

Figure 1:
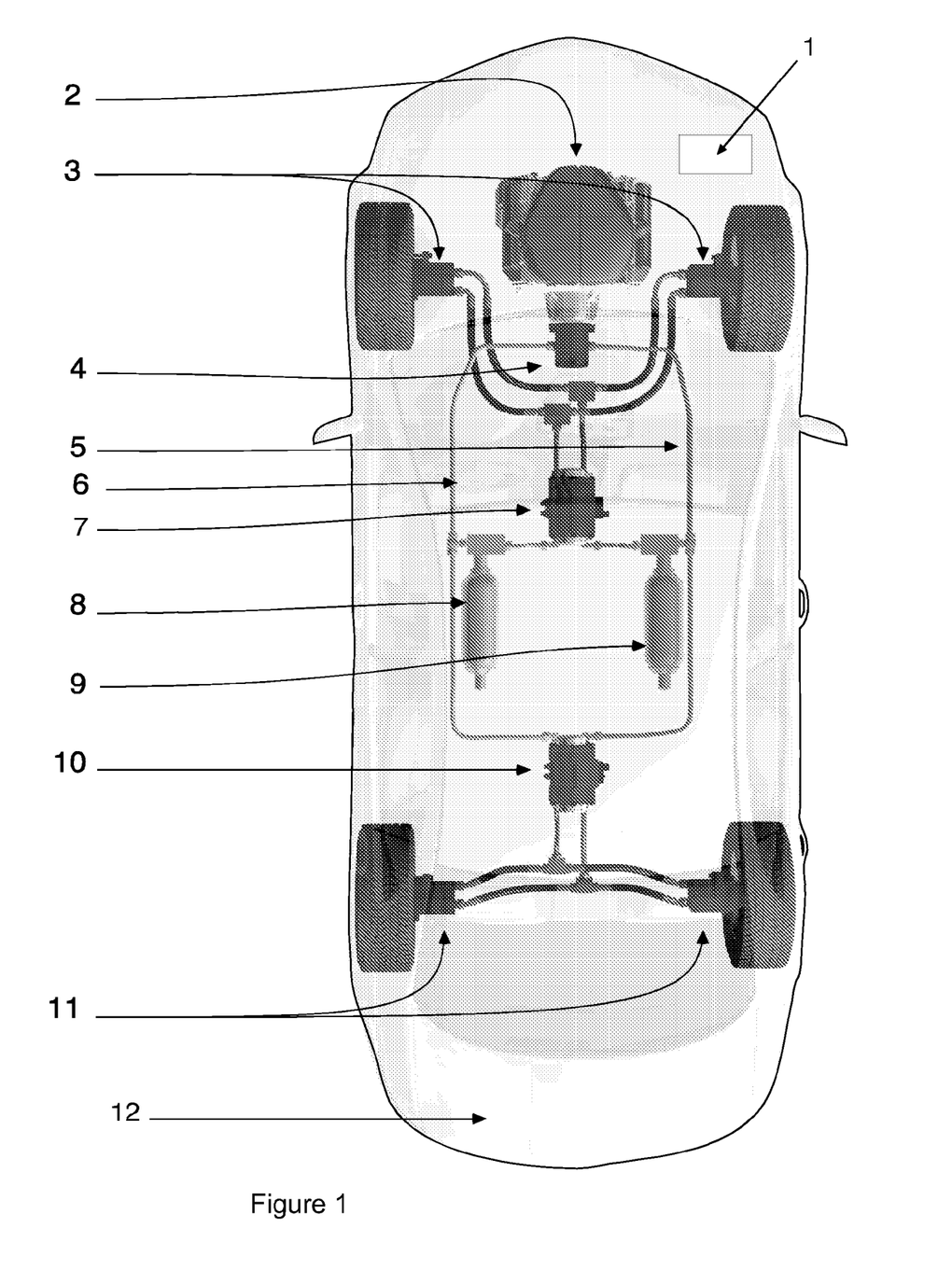
FIG. 1 schematically shows the components of a hydraulic drive of a car.

FIG. 1 shows a passenger car 12 with the various components of a hydraulic drive system for the car wherein all four wheels of the car 12 are driven. The drive system comprises an internal combustion engine 2 that drives a constant displacement pump 4 that pumps hydraulic fluid from a common low-pressure rail 6 to a common high-pressure rail 5. The common low-pressure rail 6 is connected to a low-pressure accumulator 8 and the common high-pressure rail 5 is connected to a high-pressure accumulator 9. A drive control system 1 controls the internal combustion engine 2 and this drive control system 1 maintains by controlling the rotation speed and/or the starting or stopping of the internal combustion engine 2 such that the hydraulic pressure in the common high-pressure rail 5 is between a high and a low value.

The front wheels of the passenger car 12 each have a front wheel motor/pump 3 that is connected to a front axle hydraulic transformer 7. Document WO97/31185 describes the operation principle of a hydraulic transformer; hereafter the design of the hydraulic transformer is further elucidated. The front axle hydraulic transformer 7 is also connected to the common high-pressure rail 5 and the common low-pressure rail 6 and is controlled by the drive control system 1. The rear wheels of the passenger car 12 each have a rear wheel motor/pump 11 that is connected to a rear axle hydraulic transformer 10. The rear axle hydraulic transformer 10 is connected to the common high-pressure rail 5 and the common low-pressure rail 6 and is controlled by the drive control system 1. In other embodiments of passenger cars 12, only the front wheels are driven or only the rear wheels are driven. The hydraulic drive systems for these cars are similar and form a simplified version of the described embodiment. Hydraulic drive systems for commercial vehicles are similar with front wheel drive, rear wheel drive, or four-wheel drive as well. The wheel motor/pump 3, 11 is designed such that it acts as a motor for driving the wheel 22 and that it acts as a pump for braking the wheel 22.

FIGS. 2-5 schematically show how a wheel motor/pump 3, 11 drives and brakes an attached wheel 22 with a wheel rotation direction 23; the shown design is for all wheels similar. Braking the rotation of the motor/pump 3, 11 and the wheel 22 by pumping hydraulic fluid back into the common high-pressure rail 5 recuperates the kinetic energy of the speeding vehicle. The wheels 22 have an additional brake system of conventional design used for emergency braking if required and for braking during standstill or parking. An interrupted line in the FIGS. 2-5 indicates the hydraulic transformer 7, 10 as such. The motor/pump 3, 11 is directly coupled to the wheel 22. A first motor/pump connection 26 and a second motor/pump connection 25 connect the motor/ pump 3, 11 to the hydraulic transformer 7, 10. The first motor/pump connection 26 connects to a first user connection port 13 of the hydraulic transformer 7, 10. The second motor/pump connection 25 connects to a second user connection port 18 of the hydraulic transformer 7, 10. The common high-pressure rail 5 connects via a high-pressure connection HP to the high-pressure port 15 of the hydraulic transformer 7, 10.

The first motor/pump connection 26 further connects via a reverse propulsion valve 24 and a low-pressure connection LP to the common low-pressure rail 6 and the second motor/pump connection 25 connects via a forward propulsion valve 20 and the low-pressure connection LP to the common low-pressure rail 6. The forward propulsion valve 20 and the reverse propulsion valve 24 each have two positions. A spring 19 pushes the valves 20, 24 in a first position and an actuator 21 controlled by the drive control system 1 can bring the valves 20, 24 in the second position. In the first position, a check valve in each valve 20, 24 prevents flow from the first, respective the second motor/pump connection 25, 26 to the low-pressure connection LP and in the second position the first, and respective the second motor/pump connection 25, 26 have an open connection to the low-pressure connection LP.

In the first position of the valves 20, 24 oil flow is only possible from the low-pressure connection to the hydraulic transformer 7, 10 so that the wheel motor/pump 3, 11 can only act as pump and the wheel 22 has to supply energy and brakes independent of the setting of the hydraulic transformer 7, 10. This means that with the valves 20, 24 in the first position inadvertently driving the wheels 22 is not possible.

FIGS. 2-5 show the hydraulic transformer 7, 10 schematically with the three ports 13, 15 and 18 that are part of a port plate 30 (see FIGS. 8, 9, 11) and shown as arcs around a circle indicating a rotation group 17. A top dead centre TDC indicates the setting of a top dead centre of piston movement 14 in the rotation group 17 at varying transformer control angles δ. In the circle, an arrow 16 indicates the direction of rotation of the rotation group 17. The areas p and m indicate where in the rotation group 17 a volume of a chamber 65 (see FIG. 11) above the pistons 42 (see FIGS. 8, 9, 11) decreases or increases during rotation of the rotation group 17 areas and acts as in a pump or motor respectively.

Figure 2:
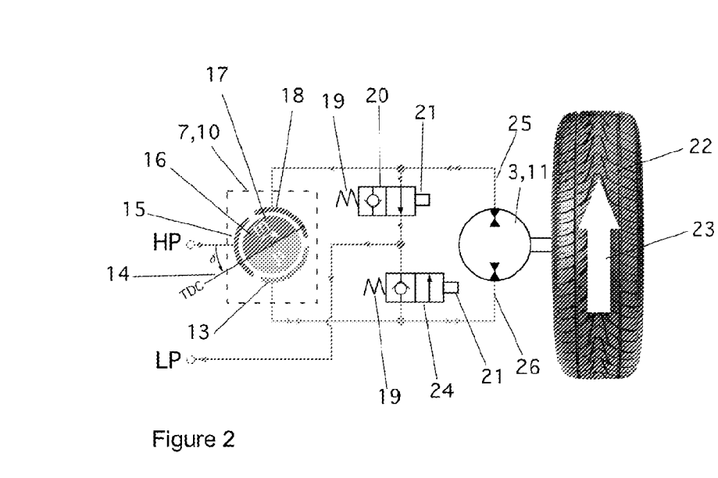
FIG. 2 shows a diagram of a drive and brake system of a hydraulic driven wheel of a car driving forward.

FIG. 2 shows the transformer control angle δ set so that hydraulic pressure in the high-pressure port 15 drives the rotation of the rotation group 17 of the hydraulic transformer 7, 10. The pistons in the area p in the rotation group 17 pump the hydraulic fluid via the first user connection port 13 and the first motor/pump connection 26 to the wheel motor/pump 3, 11. The setting of the transformer control angle δ determines the pressure of the hydraulic fluid in the first motor/pump connection 26 and so determines the driving torque. The reverse propulsion valve 24 is closed so that the hydraulic fluid flows only to the wheel motor/pump 3, 11 and causes the wheel 22 to rotate in the rotation direction 23 and the passenger car 12 starts moving at an increasing speed. The forward propulsion valve 20 is in the second position so that hydraulic fluid flowing at low-pressure from the wheel motor/pump 3, 11 through the second motor/pump connection 25 can flow to the low-pressure connection LP and to the second user connection port 18 of the hydraulic transformer 18.

Figure 4:
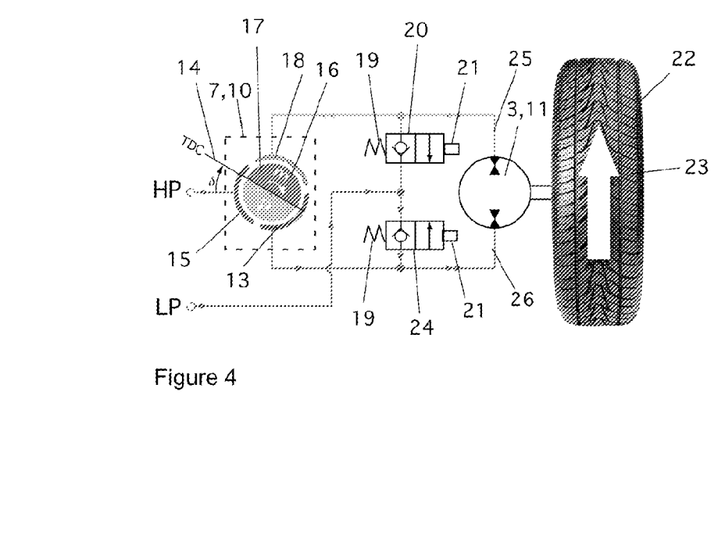
FIG. 4 shows a diagram of the drive and brake system of a hydraulic driven wheel of a car riding forward and braking.

FIG. 4 shows the transformer control angle δ set at an opposite angle as compared to the situation shown in FIG. 2 and the forward propulsion valve 20 is closed as well. In this setting, the wheel motor/pump 3, 11 exerts a braking torque on the rotating wheel 22 so that its speed reduces. The wheel motor/pump 3, 11 now acts as pump and it pumps hydraulic fluid through the second motor/pump connection 25 to the second user connection port 18. In the hydraulic transformer 7, 10, the hydraulic fluid expands in the chambers above the pistons of the rotation group 17 in the area m. These pistons drive the rotation group 17 in the direction indicated with the arrow 16. The chambers above the pistons connect first to the second pump user connection port 18 and after that to the high-pressure port 15. When the chambers are connected to the high-pressure port 15, the pistons in the rotation group 17 compress hydraulic fluid to the high-pressure connection HP. The wheel motor/pump 3, 11 supplies the energy required for this compression by pumping hydraulic fluid at a raised pressure in the second motor/pump connection 25 and this results in a braking torque on the wheel 22. The setting of the transformer control angle δ determines the pressure of the hydraulic fluid in the second motor/pump connection 25 and so determines the braking torque. The first user connection port 13 and the low-pressure connection LP via the check valve in the forward propulsion valve 20 provide the hydraulic fluid that the wheel motor/pump 3, 11 pumps in the second motor/pump connection 25.

Figure 3:
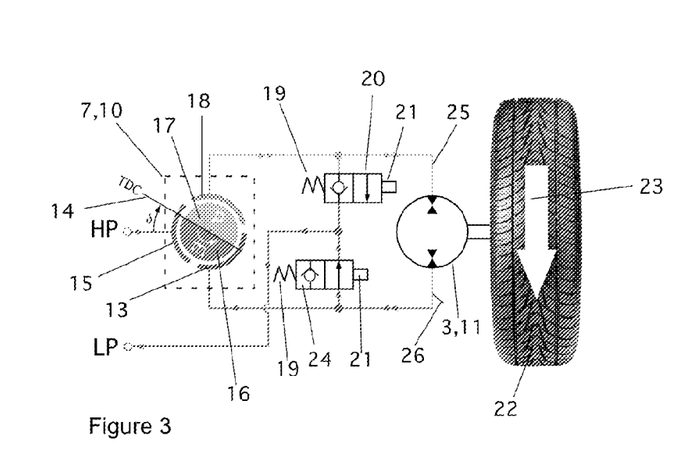
FIG. 3 shows a diagram of the drive and brake system of a hydraulic driven wheel of a car driving reverse.
Figure 5:
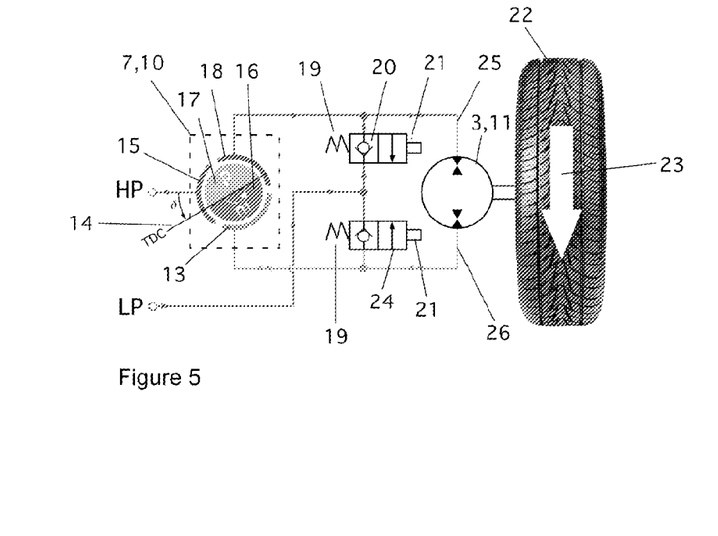
FIG. 5 shows a diagram of the drive and brake system of a hydraulic driven wheel of a car riding reverse and braking.

FIGS. 3 and 5 show the settings of the hydraulic transformer 7, 10, the forward propulsion valve 20 and the reverse propulsion valve 24 respectively in the situation that wheel motor/pump 3, 11 exerts a reverse driving torque on the wheel 22 and the situation that the wheel motor/pump 3, 11 brakes the reverse rotating wheel 22. The various settings and flows of hydraulic fluid are similar to those described for FIGS. 2 and 4.

FIG. 4 shows braking of the wheel 22 when the vehicle is driving forward. The setting of the transformer control angle δ is similar to the situation as shown in FIG. 3 wherein the wheel motor 3, 11 exerts a reverse driving torque on the wheel 22. The difference is the setting of the reverse propulsion valve 24. During braking as shown in FIG. 4, at the moment of standstill of the wheel 22 the rotor in the hydraulic transformer 7, 10 stops rotating. The rotation group 17 cannot start to rotate in the opposite direction (as is possible in the situation shown in FIG. 3) due to the settings of the propulsion valves 20, 24 and the wheel remains stationary. In this way the propulsion valves 20, 24 act to release a driving torque in the desired direction of rotation of a wheel independent of the setting of the hydraulic transformer 7, 10. In a situation that the drive control system 1 is switched off the springs 19 will set the propulsion valves 20, 24 in a position that the wheel motor/pump 3, 11 can only generate a braking torque so that undesired acceleration of the wheels 22 is prevented under all circumstances.

Figure 6:
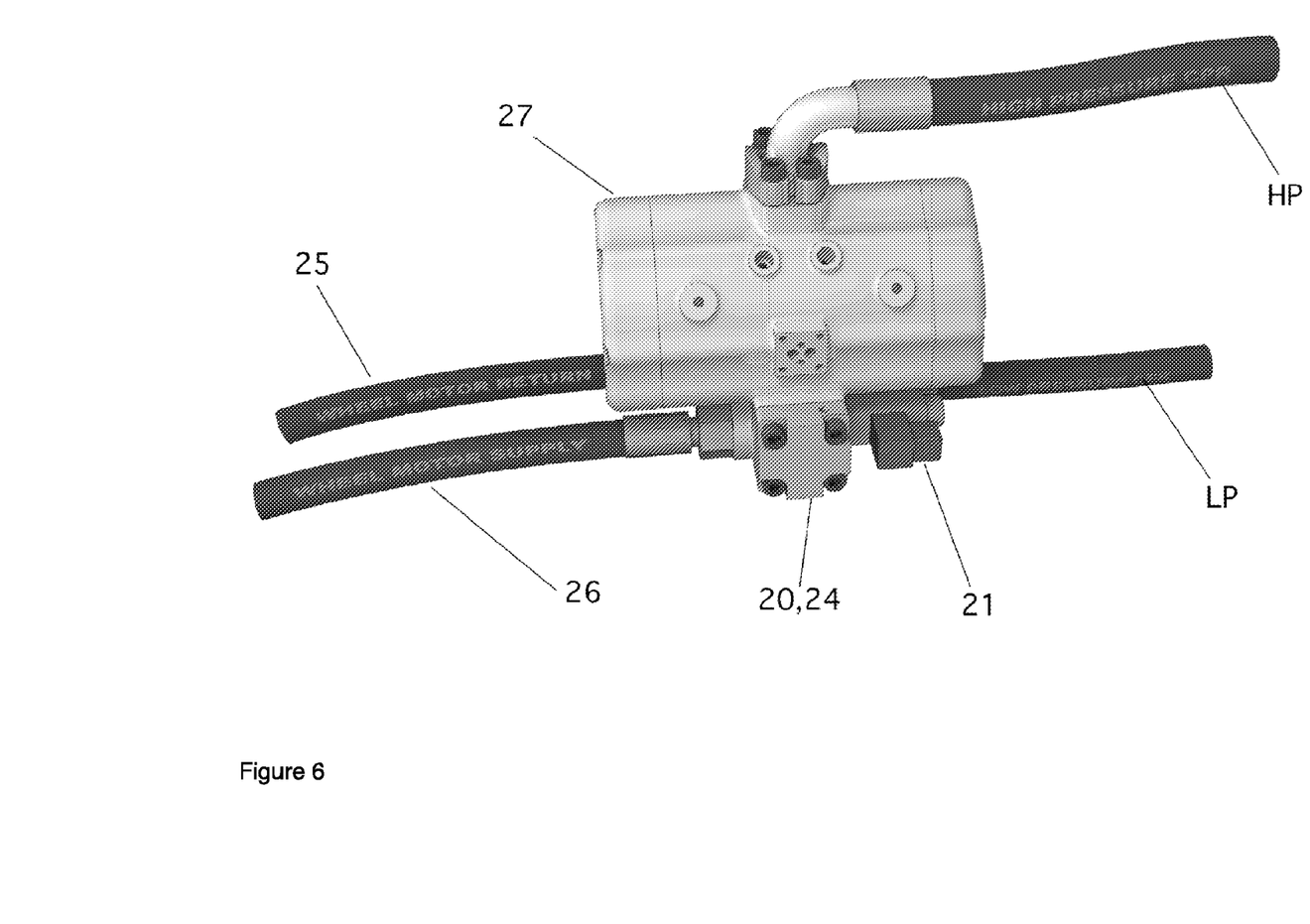
FIG. 6 shows a perspective view of a hydraulic transformer assembly for use in the hydraulic drive of a car.
Figure 7:
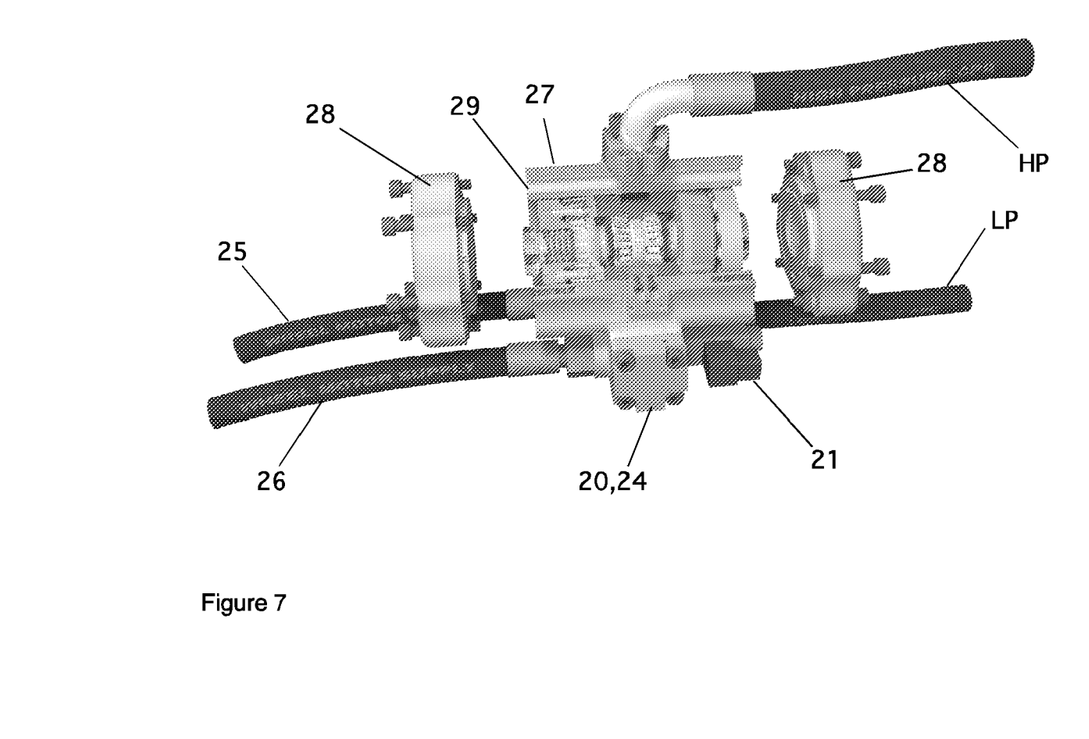
FIG. 7 shows a perspective view of the hydraulic transformer of FIG. 6 with a cut out and opened housing showing the internal parts.
Figure 8:
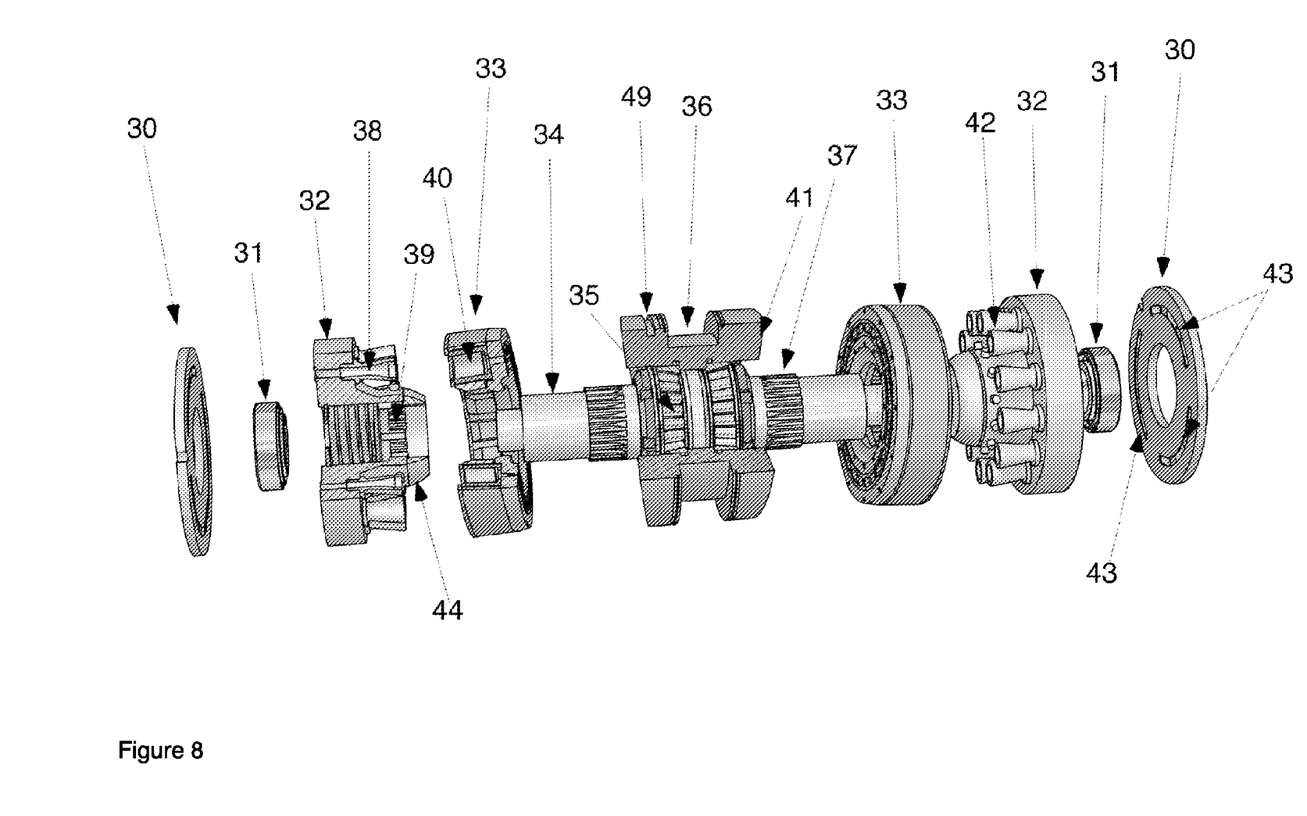
FIG. 8 shows an exploded view of the main parts of the hydraulic transformer of FIGS. 6 and 7 excluding the housing.
Figure 9:
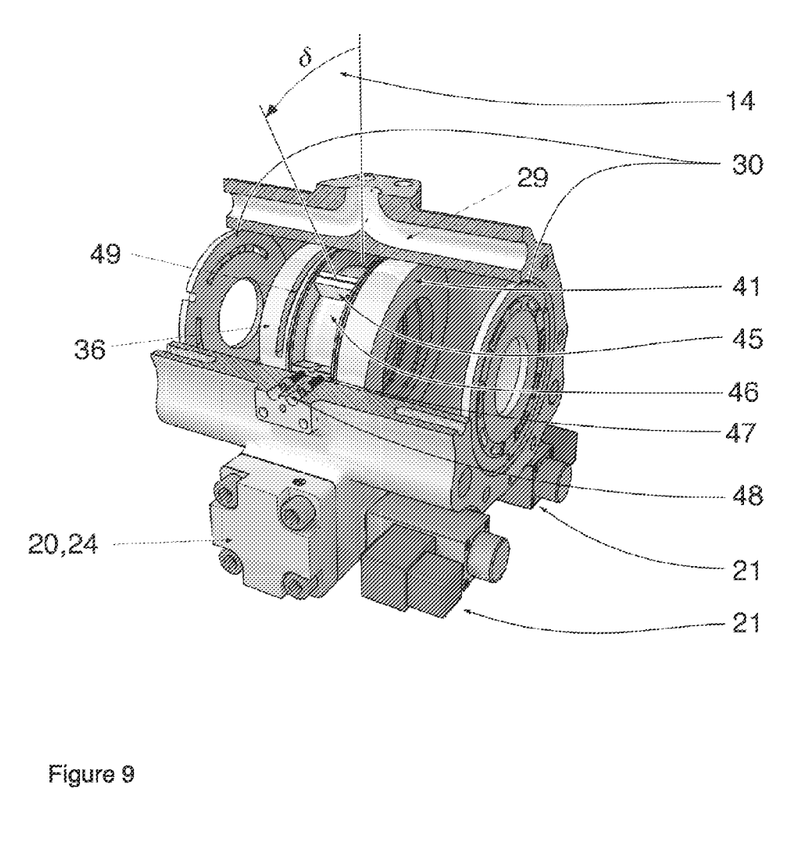
FIG. 9 shows a perspective view with a cut out of the housing of the hydraulic transformer assembly of FIGS. 6-8 without the rotating parts and end covers.
Figure 10:
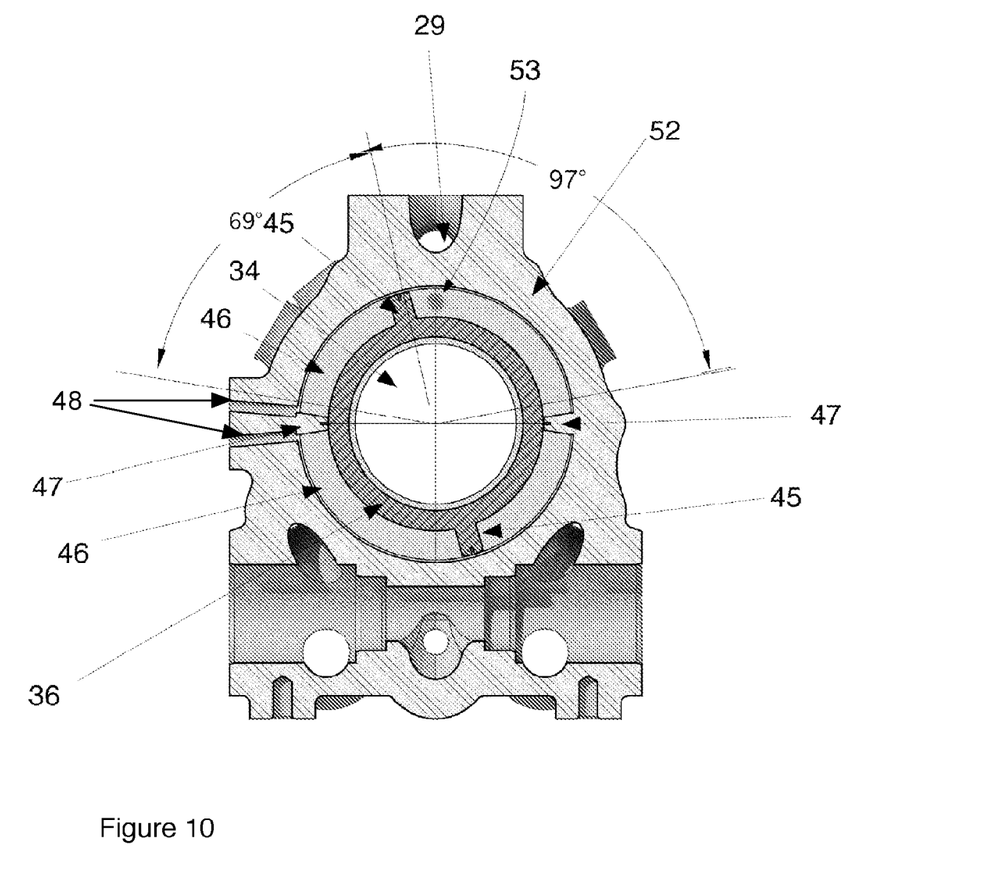
FIG. 10 shows a section through the hydraulic transformer of FIGS. 6-9 with an actuator for setting the transformer control angle.
Figure 11:
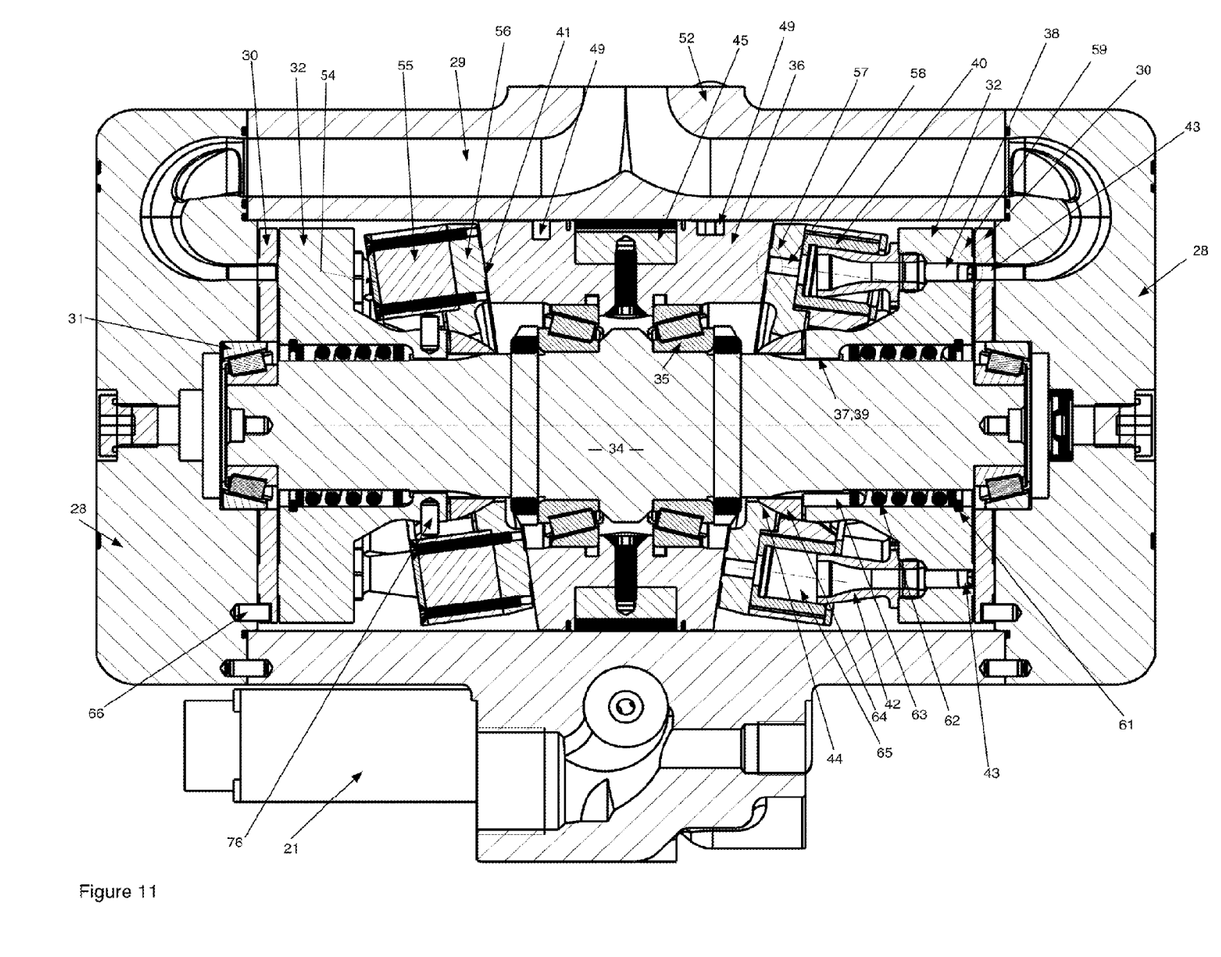
FIG. 11 shows a longitudinal section through the hydraulic transformer of FIGS. 6-10.

FIGS. 6 and 7 show external views of a hydraulic transformer assembly 27, which comprises the hydraulic transformer 7, 10 with the propulsion valves 20, 24. FIGS. 8 and 9 show the various components inside the housing 52 of the hydraulic transformer assembly 27 in perspective view. FIGS. 10 and 11 show respectively a cross section and a longitudinal section of the hydraulic transformer assembly 27.

The hydraulic transformer assembly 27 includes the components as shown in FIGS. 2-5 such as the hydraulic transformer 7, 10, the propulsion valves 20, 24 and an actuator 21 for each propulsion valve 20, 24. The first motor/pump connection 26 and the second motor/pump connection 25 each connect the transformer assembly 27 to two front wheel motor/pumps 3 or to two rear wheel motor/pumps 11. A housing 52 has at both ends covers 28, a rim aligns the covers 28 inside the housing 52. Bearings 31 are mounted in the covers 28, the bearings 31 support a shaft 34. At both ends of the shaft 34 there is a rotor 32. The shaft has outer splines 37 that cooperate with the inner splines 39 of the rotor 32 so that both rotors 32 rotate with the shaft 34. Both rotors 32 have pistons 42 whereby the inner and outer splines 37, 39 are set in such a way that the rotative positions of the pistons 42 of one rotor 32 are between the rotative positions of the pistons 42 of the other rotor 32.

A pin 76 synchronizes the rotation of a barrel assembly 33 comprising a barrel plate 56 and cups 40 with the rotation of the rotor 32. The shaft 34 supports a swivel bearing sphere 64 that supports a spherical swivel bearing 44 of the barrel plate 56 so that the barrel plate 56 can swivel relative to the rotor 32. A spring 62 pushes at one side against a support ring 61 that is fixed on the inside of the rotor 32. The spring 62 pushes at its other side against pressure pins 63 that push against the swivel bearing sphere 64 and so push the barrel plate 56 and the rotor 32 in opposite directions. The barrel plate 56 supports cups 40 which are mounted side by side and between cup positioners 55. A cup holding plate 54 holds the cups 40 and the cup positioners 55 on the barrel plate 56.

Pistons 42 are mounted on rotor 32 and each forms with the cup 40 a chamber 65 that has a changing volume. The piston 42 has a piston canal 38 that extends through the rotor 32 and forms a canal with a port 43 in a port plate 30. The port plate 30 has a pin 66 that maintains the port plate 30 in a fixed rotative position in the cover 28 and with that relative to the housing 52. From the port 43 the canal continues as a canal in the cover 28 and a canal 29 in the housing 52 to the first user connection port 13, second user connection 18 or the high pressure connection HP (as shown in FIGS. 2-5).

Bearings 35 are mounted on the shaft 34 and support a swash block 36 that can rotate a limited angle in the housing 52. The swash block 36 has at both sides inclined swash plate surfaces 41 that support the barrel plates 56. The barrel plates 56 swivel around the swivel bearing sphere 64 and rest against the inclined swash plate surfaces 41 so that the pistons 42 move in and out the cup 40 during rotation of the shaft 34. Due to the swiveling movement the volume of the chamber 65 changes between a minimum and a maximum value. By rotating the swash block 36 in the housing 52 the rotative position of the rotor 32 where the volume of the chamber 65 is minimal, which is the top dead centre TDC indicated with 53 can be set to a desired value.

FIG. 10 shows the top dead centre 53 of the swash plate surfaces 41. In the shown embodiment the swash plate surfaces 41 at both sides of the swash block 36 intersect in a line perpendicular to the rotation axis of shaft 34 so that the top dead centre 53 for the volume of the chambers 65 at both sides of the swash block 36 is at the same rotative position and as the pistons 42 on the one side of the swash block 36 are between the pistons 42 on the other side of the swash block 36, the minimum value at both sides of the swash block 36 follow each other.

In the outer circumference of the swash block 36 there is a groove with moving vanes 45 diametrically opposite each other and sealing against the inner surface of the housing 52. In the housing 52 there are diametrically opposed stationary vanes 47. The stationary vanes 47 and the moving vanes 45 form in the housing four pressure chambers 46 that have a TDC control connection ports 48 connected to a swash block control valve (not shown). The pressure chambers 46 rotate the swash block 36 in the housing 52. The swash block 36 has a detector groove 49 that cooperates with a sensor (not shown) for detecting the rotative position of the swash block 36.

The moving vanes 45 are mounted on the swash block 36 in such a way that the top dead centre of the swash plate 53 can rotate over 97 degrees in one direction and 69 degrees in the opposite direction. This asymmetry makes it possible to set the hydraulic transformer assembly 27 in such a way that the first user connection port 13 has a higher pressure than the high-pressure port 15. In this way it is possible when the common high-pressure rail 5 has a lower pressure than the maximum pressure on which the hydraulic transformer assembly 27 can operate, which occurs during normal driving in order to be able to recuperate kinetic energy during braking, to bring full the maximum hydraulic pressure on the first motor/pump connection 26 and make maximum acceleration of the vehicle possible.

Figure 12:
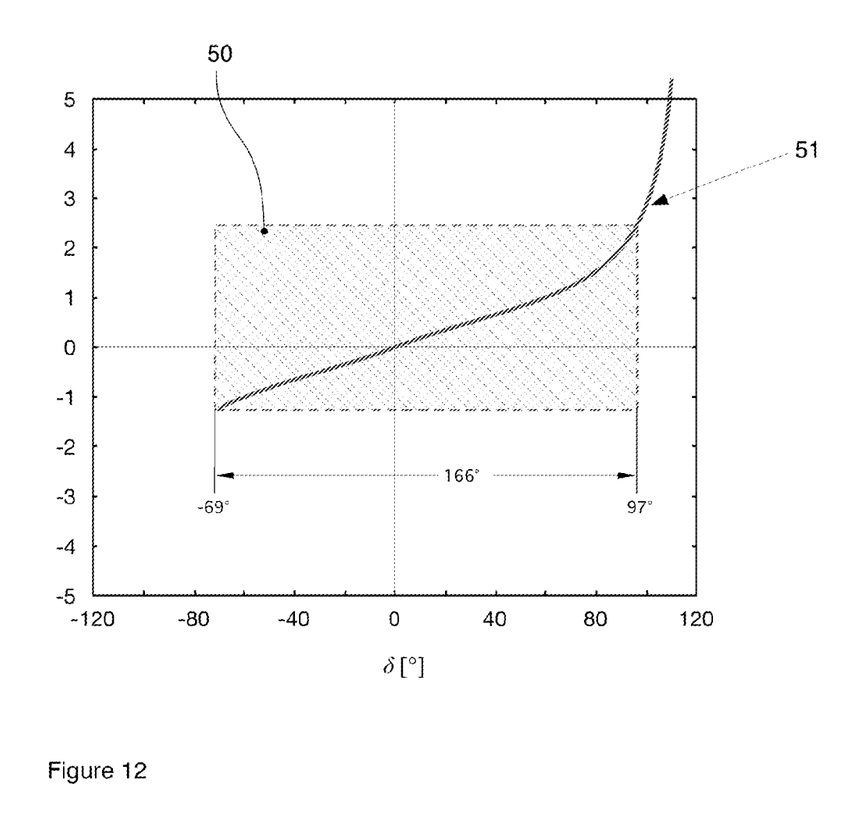
FIG. 12 shows graphically the pressure quotient of the pressure of the operation pressure and the high pressure in dependence of a transformer control angle.

FIG. 12 shows the quotient of the first user connection port 13 and the high-pressure port HP in dependence of the angle δ of the top dead centre 53 of the swash plate surfaces 41. A line 51 shows the pressure quotient in dependence of the transformer control angle δ. An operating range 50 of the hydraulic transformer is chosen such that although the transformer can be used for driving and braking in both directions of rotation (four-quadrant use) the settings of the transformer are asymmetrical so that the driving torque can be higher than the braking torque.

The oil pressure in the chambers 65 pushes the barrel plate 56 against the swivel block 36 and the rotor 32 against the port plate 30. This is the main axial force, except in situations where the oil pressure is very low. In that situation the force of the spring 62 presses the rotor 32 and the barrel plate 56 against respective the port plate 30 and the swivel block 36 in order to prevent oil leakage and facilitate starting. The forces on the rotor 32 in the axial direction of the rotation axis of the shaft 34 created by the oil pressure in the chambers 65 are necessary for creating a seal in the second axial bearing 59 and are in part balanced by forces of oil pressure in the piston canal 38 and the port 43 in the second axial bearing 59 between the rotor 32 and the port plate 30.

The forces on the barrel plate 56 caused by the oil pressure in the chambers 65 and are necessary for creating a seal in the first axial bearing 57. These forces are in part balanced by forces of oil pressure in the first axial bearing 57. For this a barrel plate canal 58 connects the chamber 65 and the first axial bearing 57. The forces in axial direction on both sides of the swivel block 36 are more or less identical in opposite direction so that this brings no load on the bearings 35.

The forces in radial direction on the swivel block 36 are guided through the respective bearing 35 and the outer splines 37 via the inner splines 39 to the pistons 42 where they are counteracted by the radial hydraulic forces on the pistons 42 that are caused by the asymmetric surface to which the hydraulic pressure subjects those piston 42. Due to the slight inclination of the swath plate surface 41 these forces are limited and cause no undesirable loads or deformations.

The hydraulic transformer has two first axial bearings 57 and two second axial bearings 59. In these bearings 57, 59 a rotating part, the rotor 32 or the barrel plate 58, with a number of canals with fluid of high pressure, respectively the piston canal 38 and the barrel plate canal 57, seals against a stationary part, respectively the port plate 30 and the swivel block 36. In prior art the sealing comprises a rim that is pressed against a flat surface with a narrow gap in the range from 2 to 14 micron between them. A narrow gap of limited height reduces the leakage over the sealing. The disadvantage of a too narrow gap is that it brings the risk that local deformation in one of the parts, for instance due to local heat generation, leads to local metallic contacts and so to lack of lubrication and to undesired wear.

Figure 13:
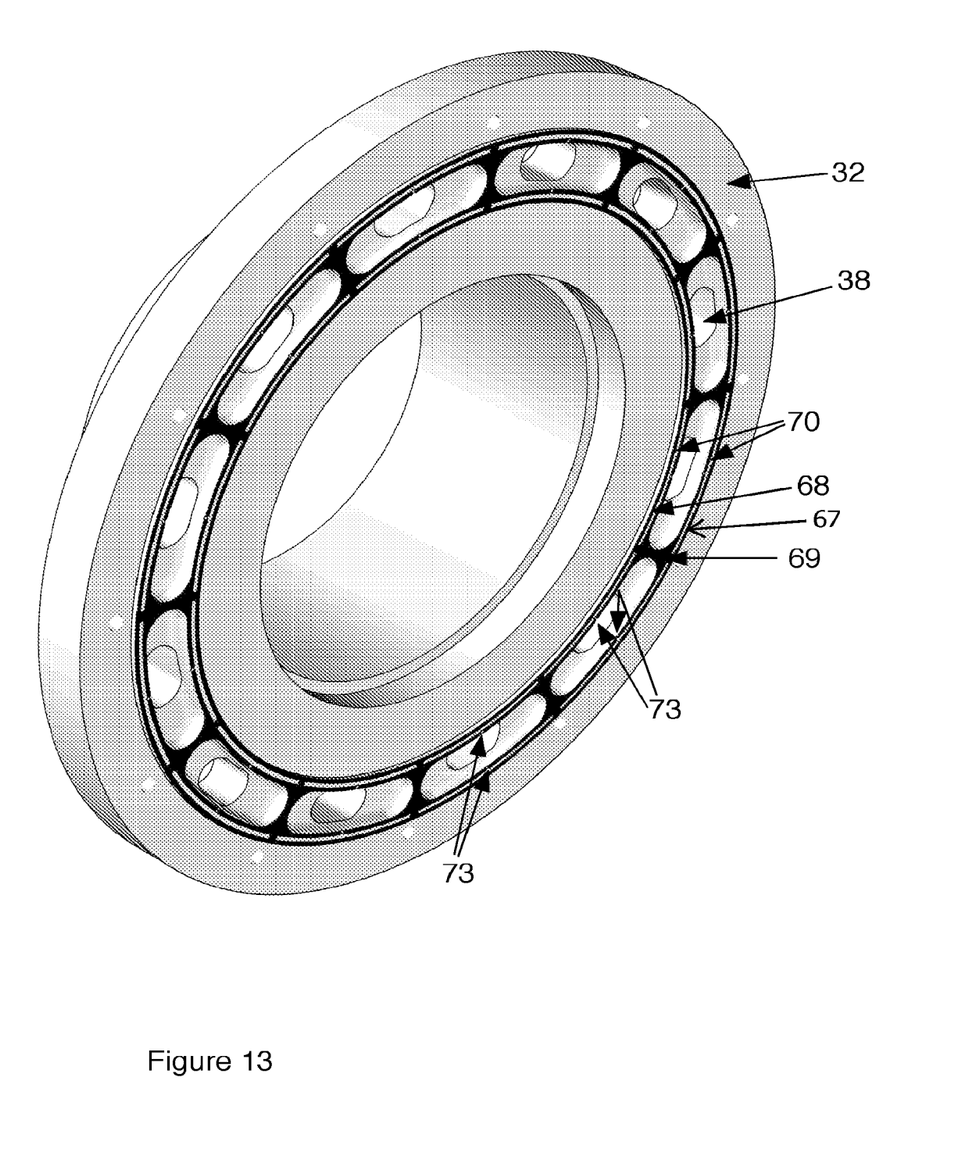
FIG. 13 shows a perspective view of a sealing area on a rotating part.
Figure 14:
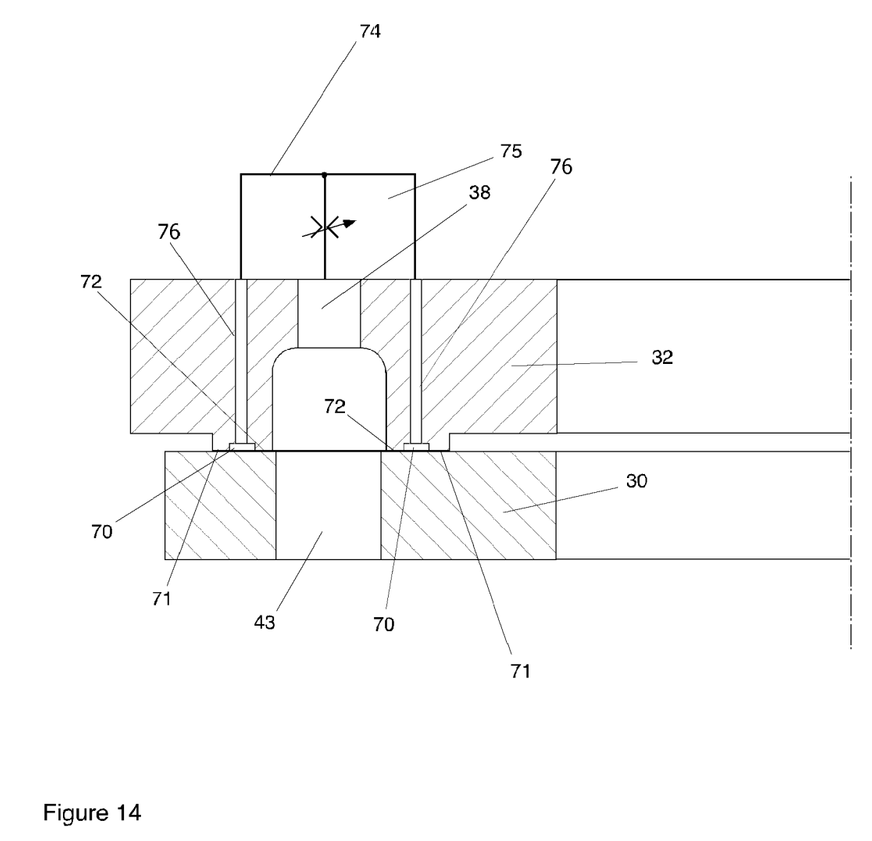
FIG. 14 shows a schematic section through a sealing area between a rotating and a stationary part.

FIGS. 13 and 14 show the first and second axial bearing 57, 59 of the hydraulic transformer assembly 27. FIG. 13 shows a perspective view of the rotor 32 showing the second axial bearing 59. An outer ridge 67, inner ridge 68 and radial ridges 69 surround a recess that forms the end of the piston canal 38 in the rotor 32. In FIG. 13 the ridges 67, 68 and 69 are indicated in black and this black surface is the surface that seals against a sealing surface of the port plate 30. Each recess around a piston canal 38 connects intermittently to one of the three ports 43 in the port plate 30 and during the passage from one port 43 to the next port 43 the radial ridge 69 blocks the oil flow between the ports 43 by sealing on the bridge between the ports 43. The outer ridge 67 and the inner ridge 68 are provided with ridge chambers 70 that have a surface of approximately 50% of the surface of the ridges 67, 68 respectively. When the piston canal 38 is connected to a pressure source the ridges 67, 68 and 69 form an adjustable gap with the sealing surface of the port plate 30. Where there is a ridge chamber 70, which has a depth of at least 10-30 micron, the gap is higher and the viscous friction between the parts when rotating is reduced. The radial ridges 69 interrupt the ridge chambers 70. The depth of the ridge chambers 70 is at least 10-30 micron so that the viscous friction is reduced.

The oil pressure in the chambers 70 will be average between the hydraulic pressure on the both sides of the inner or outer ridge 67, 68 if the gaps on both sides of the chamber 70 are identical. In practice this is often not the case. If for instance the gap on the side of the piston canal 38 is a smaller than the gap on the other side of the chamber 70 the pressure in the chamber can be very low and the rotor 32 might be pressed towards the port plate 30 and the viscous friction increases. If the situation is the other way round the pressure in the chamber 70 might be high and the gaps get higher so that the leakage increases. The difference in the height of the gaps of a few microns might lead to these situations and also slight deformation in the ridges 67, 68 and 69 might lead to instability in the height of the gaps. In order to stabilize this, a slot 73 connects the chamber 70 with the high pressure side of the ridge 67, 68. The width of the slot 73 must be small and it is relatively deep in order minimize the influence of a changing gap-height. In practice the slot 73 is 30 micron wide and 30 micron deep, preferably its width is half of its depth.

FIG. 14 shows in a schematic section the second axial bearing 59. The schematic section show for each ridge 67, 68 a low-pressure side rim 71 and a high-pressure side rim 72. A canal 76 connects the chamber 70 between the low-pressure side rim 71 and the high-pressure side rim 72 with the piston canal 38 via a connecting line 74 with a restriction 75. This restriction can be adjusted by the control system, or in the parts are mechanical means that set the restriction in dependence of the circumstances of use. The restriction can for instance depend on the pressure in the piston canal 38 or it can depend on the rotation speed of the rotor 32.

In addition to the above described embodiment of the axial bearing, wherein the hydraulic pressure is supplied between ridges that form a short arc near each piston canal 38, other embodiments of axial bearings can have two concentric rings between which an oil flow with hydraulic pressure is supplied. Such embodiments can be used in machinery that has no pistons but where axial loads are generated and where the axial bearing guides these loads to a housing. In this machinery the pressure of the axial load causes a hydraulic pressure in the axial bearing, there will be control means to set the adjustable gap so that oil loss and friction resistance are optimized.

What is claimed is:

1. A vehicle with a hydraulic drive system comprising:
   a common high-pressure rail with a high-pressure accumulator,
   a common low-pressure rail with a low-pressure accumulator,
   an internal combustion engine driving a pump connected to the common high-pressure rail and the common low-pressure rail,
   at least one motor/pump unit is provided for at least one wheel, and
   at least one hydraulic transformer with 4-quadrant operation that connects to the common high-pressure rail and to the at least one motor/pump unit via a first motor line and a second motor line;
   wherein the at least one hydraulic transformer comprises a forward propulsion valve connecting the common low-pressure rail to the first motor line and a reverse propulsion valve connecting the common low-pressure rail to the second motor line,
   wherein each propulsion valve comprises a spring to hold the valve in a first position, wherein the valve acts as a check valve blocking the flow to the common low-pressure rail, and an actuator that can switch the propulsion valve to a second position, wherein the valve connects the common low-pressure rail to the first or second motor lines.

2. The hydraulic drive system of claim 1, wherein said at least one hydraulic transformer further comprises:
   a first hydraulic transformer connecting to said common high-pressure rail and connecting to said at least one motor/pump units provided for the front 2 wheels via a first motor line and a second motor line; and
   a second hydraulic transformer connecting to said high-pressure rail and connecting to at least a second motor/pump units provided for the rear 2 wheels via a third motor line and a fourth motor line.

3. A hydraulic drive system for an automobile, comprising:
   a common high-pressure rail and a common low pressure rail;
   at least one motor/pump unit is provided for at least 1 wheel; and
   at least one hydraulic transformer with 4-quadrant operation, wherein said at least one hydraulic transformer connects to said common high-pressure rail and connects to said at least one motor/pump unit via a first motor line and a second motor line;
   and wherein said at least one hydraulic transformer comprises a forward propulsion valve connecting said common low-pressure rail to said first motor line and a reverse propulsion valve connecting said common low-pressure rail to said second motor line;
   wherein each said propulsion valve comprises a spring to hold said valve in a first position, whereby said valve acts as a check valve blocking the flow between said common low-pressure rail and said first or second motor line, and an actuator that can switch said valve to a second position, thereby permitting the flow between said common low-pressure rail and said first or second motor line.

4. The hydraulic drive system of claim 3, further comprising an internal combustion engine driving a pump connected to said common high-pressure rail and said common low-pressure rail.

5. The hydraulic drive system of claim 3, wherein said common high-pressure rail has a high-pressure accumulator and said common low-pressure rail has a low-pressure accumulator.

6. The hydraulic drive system of claim 3, said at least 1 wheel further comprising 2 front wheels, and at least one motor/pump unit is provided for the 2 front wheels.

7. The hydraulic drive system of claim 6, said at least 1 wheel further comprising 2 rear wheels, and at least one motor/pump unit is provided for the 2 rear wheels.

8. The hydraulic drive system of claim 7, wherein said at least 1 hydraulic transformer further comprises:
   a first hydraulic transformer connecting to said common high-pressure rail and connecting to said at least one motor/pump units for the front 2 wheels via a first motor line and a second motor line; and
   a second hydraulic transformer connecting to said high-pressure rail and connecting to said at least a second motor/pump units for the rear 2 wheels via a third motor line and a fourth motor line.

9. The hydraulic drive system of claim 3, said at least 1 wheel further comprising 2 rear wheels, and at least one motor/pump unit is provided for the 2 rear wheels.

10. The hydraulic drive system of claim 3, wherein, when each said propulsion valve is in said first position, said valve blocks the flow toward said common low-pressure rail and away from said first or second motor line.

11. The hydraulic drive system of claim 3, wherein the at least one motor/pump unit is provided for each wheel.

12. A hydraulic drive system for an automobile, comprising:
   a common high-pressure rail with a high-pressure accumulator;
   a common low-pressure rail with a low-pressure accumulator;
   an internal combustion engine driving a pump connected to the common high pressure rail and the common low pressure rail;
   a motor/pump unit is provided for each of 4 wheels;
   a first hydraulic transformer with 4-quadrant operation, wherein said first hydraulic transformer connects to said common high-pressure rail and connects to said motor/pump units for the 2 front wheels via a first motor line and a second motor line;
   and wherein said first hydraulic transformer comprises a forward propulsion valve connecting said common low-pressure rail to said first motor line and a reverse propulsion valve connecting said common low-pressure rail to said second motor line;
   wherein each said propulsion valve comprises a spring to hold said valve in a first position, whereby said valve acts as a check valve blocking the flow between said common low-pressure rail and said first or second motor line, and an actuator that can switch said valve to a second position, thereby permitting the flow between said common low-pressure rail and said first or second motor line;
   and a second hydraulic transformer with 4-quadrant operation, wherein said second hydraulic transformer connects to said common high-pressure rail and connects to said motor/pump units for the 2 rear wheels via a third motor line and a fourth motor line;
   and wherein said second hydraulic transformer comprises a forward propulsion valve connecting said common low-pressure rail to said third motor line and a reverse propulsion valve connecting said common low-pressure rail to said fourth motor line;
   wherein each said propulsion valve comprises a spring to hold said valve in a first position, whereby said valve acts as a check valve blocking the flow between said common low-pressure rail and said third or fourth motor line, and an actuator that can switch said valve to a second position, thereby permitting the flow between said common low-pressure rail and said third or fourth motor line.

13. The hydraulic drive system of claim 12, wherein, when each said propulsion valve is in said first position, said valve blocks the flow toward said common low-pressure rail and away from said motor line.

* * * * *